United States Patent [19]

Nicol et al.

[11] Patent Number: 5,287,448
[45] Date of Patent: Feb. 15, 1994

[54] METHOD AND APPARATUS FOR PROVIDING HELP INFORMATION TO USERS OF COMPUTERS

[75] Inventors: Anne Nicol, Palo Alto; Lawrence A. Kenyon; Annette Wagner, both of Sunnyvale; James T. Sulzen, Montara, all of Calif.

[73] Assignee: Apple Computer, Inc., Cupertino, Calif.

[21] Appl. No.: 36,216

[22] Filed: Mar. 24, 1993

Related U.S. Application Data

[63] Continuation of Ser. No. 824,734, Jan. 21, 1992, abandoned, which is a continuation of Ser. No. 347,745, May 4, 1989, abandoned.

[51] Int. Cl.⁵ .......................... G06F 3/14; G06F 15/40
[52] U.S. Cl. ..................................... 395/159; 395/157; 395/155
[58] Field of Search ............... 395/159, 157, 155, 156, 395/161, 144; 340/721

[56] References Cited

U.S. PATENT DOCUMENTS

| | | | |
|---|---|---|---|
| 4,648,062 | 3/1987 | Johnson et al. | 395/155 |
| 4,789,962 | 12/1988 | Berry et al. | 364/521 |
| 4,899,276 | 2/1990 | Stadler | 340/721 |
| 4,992,972 | 2/1991 | Brooks et al. | 395/155 |
| 5,029,113 | 7/1991 | Miyoshi et al. | 395/161 |
| 5,123,086 | 6/1992 | Tanaka et al. | 395/155 |
| 5,157,768 | 10/1992 | Hoeber et al. | 395/157 |
| 5,175,812 | 12/1992 | Krieger | 395/156 |

Primary Examiner—Gary V. Harkcom
Assistant Examiner—Raymond J. Bayerl
Attorney, Agent, or Firm—Blakely, Sokoloff, Taylor & Zafman

[57] ABSTRACT

A method for presenting help messages to a user in an interactive computer environment in which a help mode operates concurrently with other programs operating in the computer system. The user receives information about an icon by positioning a pointer on the computer's video display over the icon about which more information is desired. The computer then retrieves an appropriate help message based upon user sophistication from a database of help messages stored in its memory and displays it in a graphic bubble on the video display. The graphic bubble is placed so as to not overlap the object about which more help is requested. The graphic bubble is removed as soon as the pointer is moved away from the object.

18 Claims, 3 Drawing Sheets

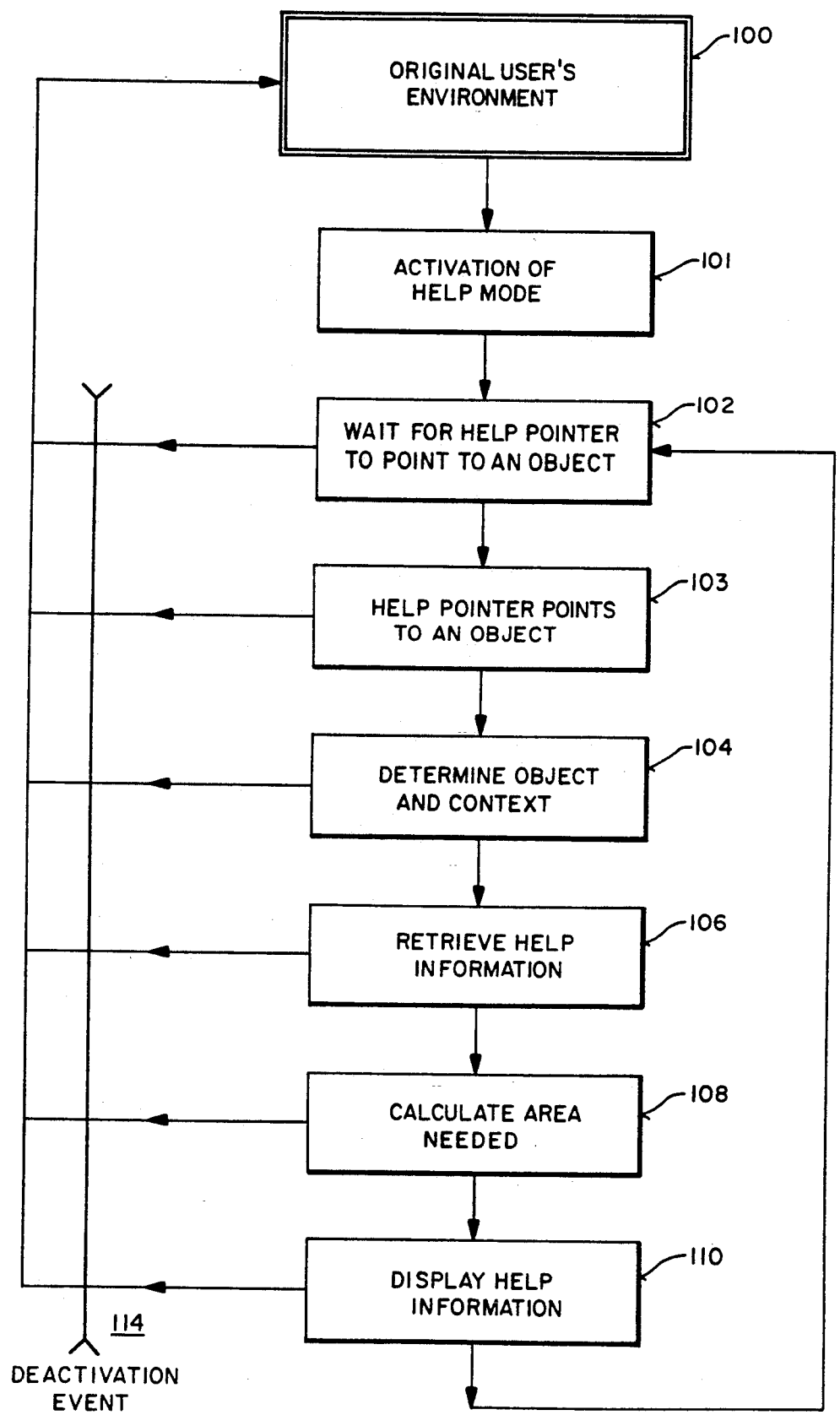

FIG_2
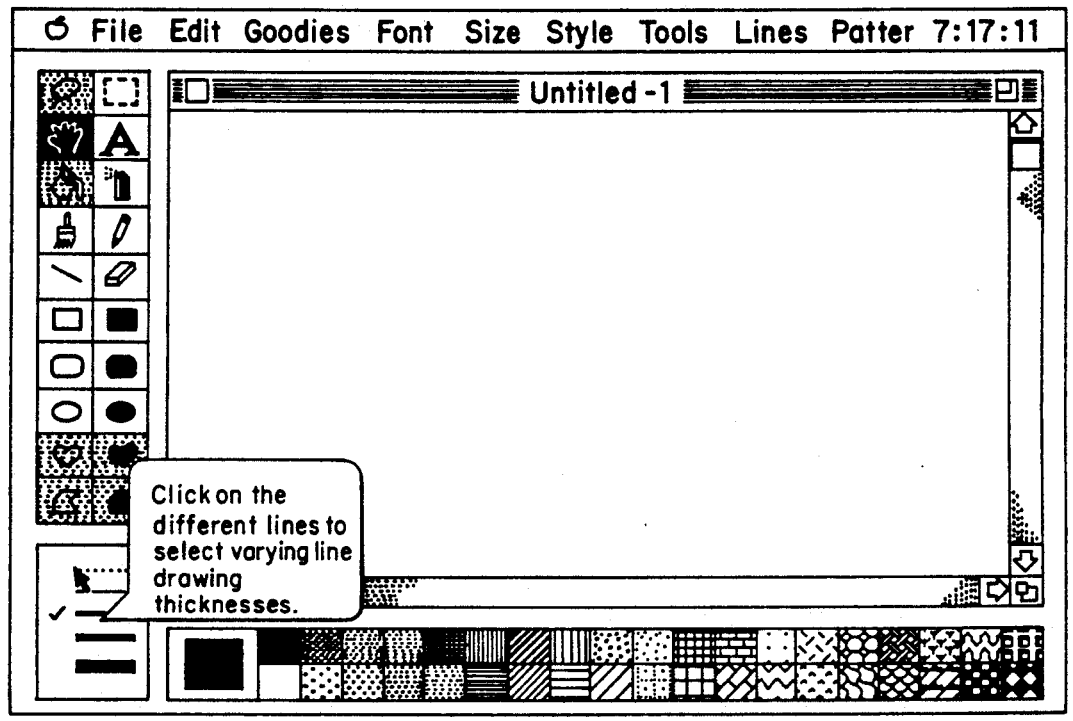
FIG_3
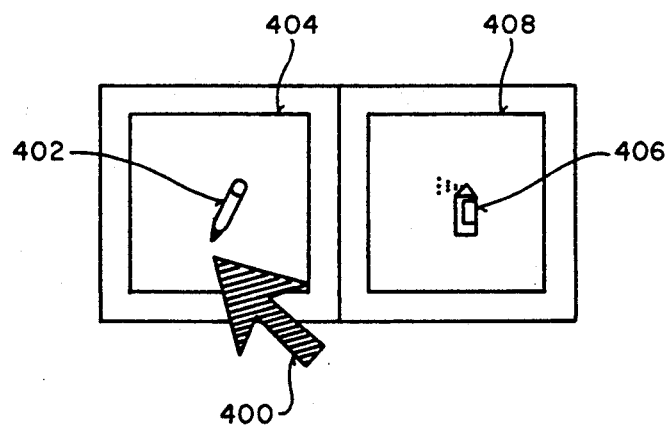

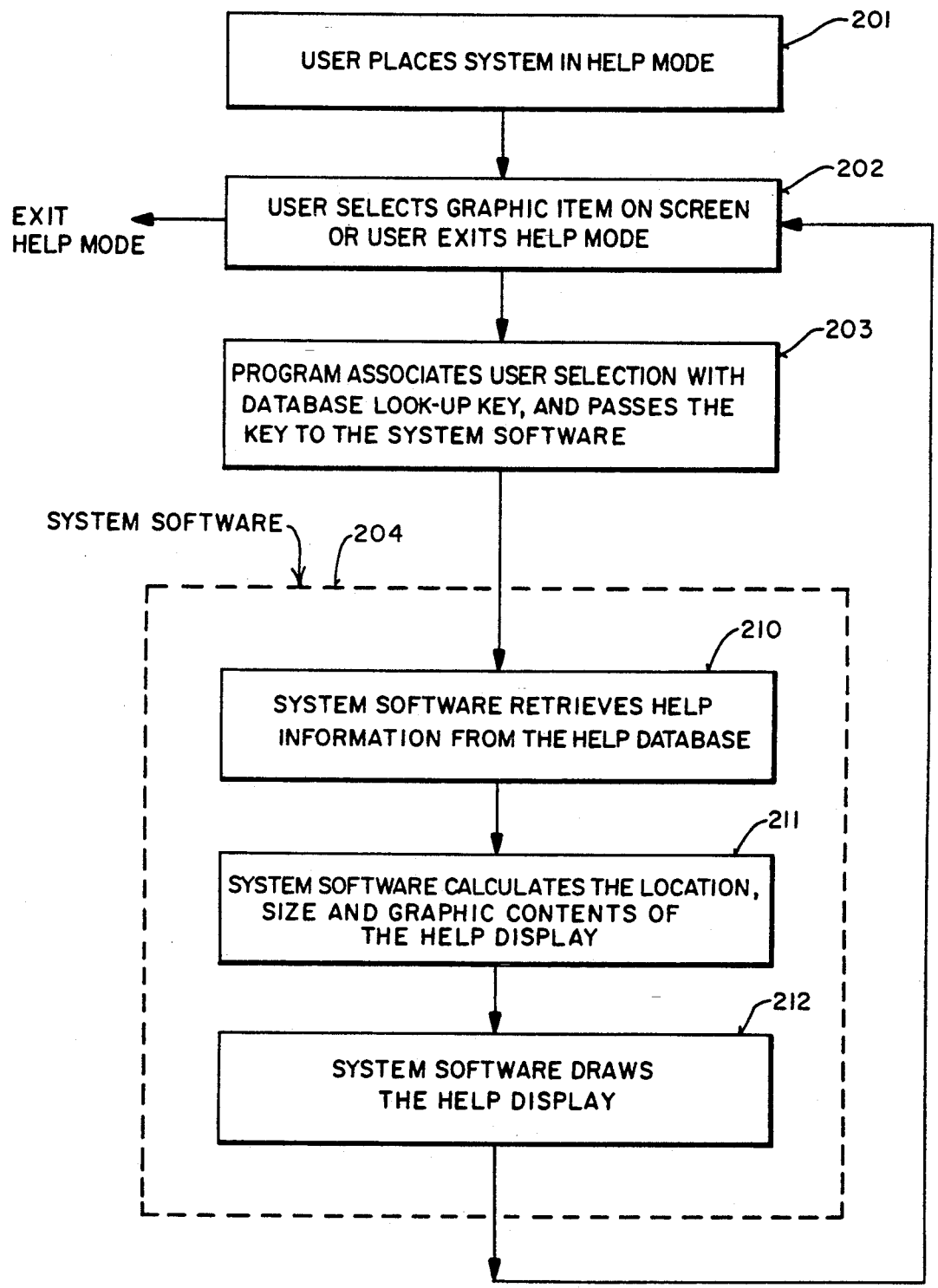
FIG_4

METHOD AND APPARATUS FOR PROVIDING HELP INFORMATION TO USERS OF COMPUTERS

This is a continuation of application Ser. No. 07/824,734, filed Jan 21, 1992, now abandoned, which is a continuation of application Ser. No. 07/347,745, filed May 4, 1989, now abandoned.

BACKGROUND OF THE INVENTION

1. Field of the Invention

The present invention relates to computer on-line help systems and, more specifically, to graphic based help methods in an interactive computer environment.

2. Prior Art

At times, a computer user may discover that he requires additional information about the computer or a particular computer program while the computer is in operation. This additional information is commonly known in the art as "help" information. If the help information is provided while a computer program is running, it is known as "on-line help." To provide on-line help, the user must have a way of accessing help information from either the computer's operating system or the program which is running. Typically, a computer program will incorporate a help sub-program to access the information. The help sub-program only displays the help information when requested by a user.

One common method of providing on-line help involves using the entire video display screen of the computer to display help messages. The help messages temporarily displace the program's normal display. When the user signals the computer that the help messages are no longer needed, the computer erases them from the display and reestablishes the normal display. Alternately, some programs have a separate area on the screen for help messages.

Having a help sub-program which displaces the program's normal display in order to present help messages is known in the art as "on-line documentation." The help messages typically concern a particular detail about the program and will often also have statements about peripheral, although related, subjects. These messages are usually indexed and associated with key words or phrases. On-line documentation is generally structured like a manual, and users can flip through its electronic "pages." However, the context that created the user's query does not influence determining what help information is provided. Thus, on-line documentation is not able to decide which of its many messages is most appropriate when the user requests help. Another problem with on-line documentation is that, since the help messages displace the entire screen display when called up, the user is not able to see the program's display which led to his requesting help.

Providing a separate section of the video display for user messages avoids some of on-line documentation's problems. The screen display is not entirely displaced. Thus, the user is able to see the output of the program which led to his request for help. However, reserving a portion of the display for user messages restricts both the program's display area and the help messages' size and shape.

Another drawback of prior art systems is that the information available is typically limited to a single level of sophistication. The user is not able to obtain more detailed information about a particular topic if desired. Although hierarchically organized help systems are known in the art, the hierarchy represents categorization levels rather than sophistication levels. Categorization levels refer to a help program whose help messages are arranged in an outline form of main topics, sub-topics, sub-sub-topics, etc. Employing a hierarchial help system facilitates a user in discovering a desired topic's help message. But that message may present information which is either too simple or too sophisticated for the user's needs. Providing different levels of sophistication in a help system improves the user's ability to understand the computer program.

SUMMARY OF THE INVENTION

The present invention overcomes the disadvantages of the prior art by providing a method and apparatus for presenting help messages to a user in an interactive computer environment. With the present invention, a help mode of the computer operates concurrently with other software programs, without taking precedence. The user receives a help message about an icon by positioning a pointer, by for example using a mouse, on the computer's video display over the icon about which more information is desired. The computer then retrieves an appropriate help message from a database of help messages stored in its memory and displays it in a graphic bubble on the video display. The graphic bubble is placed so as to not overlap the icon about which more help is requested. The graphic bubble remains on the screen until the pointer is no longer over the icon.

The present method provides messages which are context sensitive. Context refers to the program's state at the time of the request—what operation was being performed, what was displayed to the user, the selected items on the display, the current state of the computer, etc. Another element of context can be the type of help requested. For example, the user may specify that help requests look for the answer to one of a variety of questions. Still another element of the context can be the user's level of sophistication. Sophistication means the relative familiarity of a user with a program or operation. The present invention provides more detailed explanations to more sophisticated users, and more general messages to the less sophisticated user. By using context, the present invention can retrieve and display appropriate messages to aid the user.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

BRIEF DESCRIPTION OF THE DRAWINGS

FIG. 1 is a flowchart diagram showing the steps of the present invention.

FIG. 2 is an illustration of a computer screen which is displaying help information in a graphic bubble according to the method of the present invention.

FIG. 3 is a representation of pointer sensitive areas as used in the present invention.

FIG. 4 is a flowchart diagram showing the method of the present invention used in conjunction with the operating system software of a computer system to provide the help information in a graphic bubble

DETAILED DESCRIPTION OF THE PRESENT INVENTION

The present invention relates to a method for providing information to computer users in an interactive computing environment. In the following description numerous specific details, such as particular keystrokes and display messages, are set forth in order to provide a more thorough understanding of the present invention. It will be apparent to those skilled in the art, however, that the present invention may be practiced without these specific details. In other instances, well known methods and data structures have not been described in detail so as not to obscure the present invention unnecessarily.

Throughout the following Specification, the present invention is described with reference to a particular type of computer operating system. Specifically, a form of operating system known as a graphic interface is described. A graphic interface displays on its video screen graphic pictorial objects known as "icons." Typically, these icons represent various tasks that can be performed by the computer or data files which are stored in the computer's memory. The user can select the icons, and hence the associated tasks or data files, in any one of a number of methods. It is common in the art to select icons with a device known as a "mouse." The mouse is a peripheral device of the computer system. A user manipulates the mouse to move a pointer on the video display over a particular icon. The user then presses a button on the mouse to select the icon. It will be apparent to those skilled in the art that other equivalent selection methods can be used.

Another common element of graphic interfaces are "pull down" menus. With a pull down menu, a user is able to quickly select from among various tasks for the computer to perform. Appropriate programming of the computer is provided such that a "menu" bar comprising a variety of command titles (for example $T_1$, $T_2$, $T_3$, etc.) is displayed on the video display. Typically, the menu bar is located horizontally across the top of the video display, although it can be placed in other locations. The user operates the mouse to select one of the particular command options (for example $T_1$). One or more sub-commands are then displayed below the command option's menu title. These sub-commands appear to be "pulled" down from the menu bar and hence give this type of menu its name. The user manipulates the mouse to select a desired subcommand for execution by the computer. It will be apparent to those skilled in the art that the present invention is not limited to use in conjuction with pull down menus, but can be adapted to operate with a variety of command selection schemes. For example, the present invention can be easily used with a graphic interface having pop up menus, where the sub-commands appear to pop up from a menu bar located at the bottom of the video display. A more detailed description of the use of a mouse and "pull down" menus in a computer having a graphic interface can be found in U.S. Pat. No. Re. 32,632 which is incorporated by reference.

While a graphic interface is used in the preferred embodiment, it will be apparent to those skilled in the art that a wide variety of computer operating systems can be employed in conjunction with the present invention. For example, the present invention may be used with an operating system that does not employ a graphic interface and requires the operator to input all instructions to the computer by typing them on a keyboard. Also, since the method of the present invention is not limited to graphic interfaces, the following description is to be regarded as illustrative rather than restrictive.

Since the present invention may be practiced on computer systems that do not have a graphic interface, it is to be understood that the choice of the term "icon" is not intended to be limited to the definition that is normally associated with a graphic interface. Instead, an icon, as used herein, is intended to include every type of object or item that may be presented on the video display of a computer system. For example, in computer systems that do not use a graphic interface, there is often provided a "command line" where the user types commands into the computer. This command line is not usually considered in the art to be an icon. However, in the present specification, the command line would fall within the definition of "icon." The user could move a pointer (or similar object such as a cursor) over the command line and receive help information via the method of the present invention. Similarly, some elements of a graphic interface such as the menu bar or display "windows" are not normally considered to be icons. However, the present invention provides help messages for these elements as well as for the elements of the graphic interface which are normally considered to be icons.

The present invention provides help messages to a computer user by displaying context-sensitive messages when help is requested. "Bubbled Help" describes the method as used in the preferred embodiment, referring to how the help messages may appear within graphic "bubbles" on the display screen (e.g., see lower left corner of FIG. 2). These graphic bubbles are usually located near the icon about which more information is requested. The bubbles are typically of a relatively small size and do not fill the entire screen.

The present invention will now be generally described with reference to its basic method of operation as illustrated in the flow chart of FIG. 1. Initially, a user interacts with a program in that particular program's environment. This is indicated in FIG. 1 as step 100, Original User's Environment. The user activates the help mode at Step 101, Activation of Help Mode. The particular activation methods which are used are described below. In the help mode, the program's normal operation is temporarily suspended although, in an alternative embodiment, the help mode may function concurrently with the normal operation of the program(s) in the original user's environment. However, in the preferred embodiment, the presentation of help information takes precedence over the operation of the program(s) in the original user's environment.

Control then proceeds to step 102, Wait for Help Pointer to Point to an Object or Deactivation of Help Mode. At step 102, the computer continually checks the location of the help pointer until one of two events occur. If the user deactivates the help mode, control returns from step 102 to 100, Original User's Environment, where, the program's normal operation resumes.

If the user positions the pointer over an object and selects that object by activating the pointer, then the computer then determines that the object is pointed to and has been selected. In the latter case, control proceeds to display a help message relating to that object.

The first task in displaying the help message is step 104, Determining Object and Context. This step determines what task or data file is associated with the icon at the help pointer's position. It also ascertains the relevant contextual information (e.g., what type of information is being requested) from the current state of the program and operating system.

Step 106, Retrieve Help Information, uses the information obtained during step 104 as key values to search the help message database. A search of the help message database locates the most appropriate help message which the computer retrieves.

Calculation of the amount of display area needed for the appropriate message occurs in step 108, Calculate Area Needed. The message itself may comprise text, graphics, numbers, or other data. The message is translated to a graphic display form, and the area needed to display the message is determined. Step 108 determines the region—both the shape and number of pixels on the video display—required to graphically display the message. When calculating the area of the display which will hold the graphic bubbles a few basic steps are followed. The length of the help message is calculated. This length is based on the number of characters in the message and the type style in which the characters are displayed. As noted, some help messages may contain non-textual information such as graphics characters. The size of this additional information is also evaluated when calculating the required size of the graphic bubble. When it is displayed, the help message is placed within a graphic bubble. Thus, in step 108 the computer system is actually calculating the size of the smallest graphic bubble which can hold the message. In order to fit the entire message within the graphic bubble, the message may be broken up into several different lines of text. In the preferred embodiment, the dimensions of the bubble have height-to-width ratio of 2:3. Of course, this specific ratio is only meant as a guideline and may be adjusted depending on the length of the help message.

The message is displayed in step 110, Display Help Information. An area on the display is selected which comprises a sufficient number of pixels to accommodate the display region determined in step 108. Additionally, the selected area is chosen so that the the bubble does not overlap the icon. The bubbles remains on the display until a new bubble is generated or the help mode is deactivated.

During any of the steps 102 through 110, the user may deactivate the help mode. Deactivation occurs most frequently during step 102 because the computer is most often waiting for the user to act. However, deactivation can theoretically occur at any time and is indicated on FIG. 1 by deactivation event 114. Deactivation event 114 causes all of the help messages to be erased and control returns from any of steps 102 through 110 directly to Original User's Environment 100.

Each of the steps in the method of the present invention will now be described in greater detail with reference to FIGS. 2 through 4. The first step is 101, Activation of Help Mode. Activation and deactivation of the help mode is controlled by a user input to the computer. Many different techniques can be used to activate the help mode. A pull down menu provides a relatively quick and easy way to activate the help mode. The user can select a command option title such as "Turn Help Mode On" or the like. In another embodiment, the user activates and deactivates the help mode by toggling a key on the computer's keyboard. This key may have the word "help" printed on it so as to readily identify its function to a user of the computer system.

When the help mode is activated in the preferred embodiment, the normal operation of the computer system is suspended. Any programs that may have been running are stopped until the help mode is deactivated. While the computer is in the help mode, it may be possible to effectuate different functions on the computer. For example, pressing a second key on the computer keyboard may cause temporary suspension of the help mode to allow the user to input data to the computer system. Depressing a third key may only remove displayed bubbles but not deactivate the help mode.

In an embodiment where the help mode operates concurrently with the program(s) of user's original environment, the help mode does not deactivate the program(s). In this embodiment, the system displays the help information for a particular icon whenever the pointer is positioned over the icon (without selecting the icon) and the program operates concurrently by performing the operation represented by the icon when the icon is selected. If the icon is not selected (but the pointer is positioned over the icon), then only help information is provided, but the operation represented by the icon may be involved (because the program is not suspended) by selecting the icon without having to exit the help mode.

In the preferred embodiment, the pointer has the shape of a question mark when the computer is in the help mode. This is in contrast to the normal operation when the pointer appears as an arrow or a similar item. Changing the shape of the pointer enables the user to quickly identify when the computer is in the help mode. While the help mode is activated, the pointer is referred to as the "help pointer".

Once the user activates the help mode, in the preferred embodiment the present invention obtains control of the computer in step 102 and waits for one of two events to occur. The wait state terminates when the user either deactivates the help mode or selects an icon. The various deactivation methods are described below. To obtain help information about an icon in the preferred embodiment, the user positions the help pointer at the icon and selects the icon (and thereby requests help for that icon) by pressing a button on a mouse device. Of course, other selection and pointer activation mechanisms, such as keyboard entries, may be employed. Another way of selecting an icon involves a pull-down menu. Each subcommand in the pull-down menu has an appropriate help message associated with it. When the help pointer moves from one subcommand to an adjacent subcommand, a different help message appears. When seeking help messages for the sub-commands, the user is not required to select each subcommand by performing any action other than moving the pointer over each subcommand. That is, the user obtains help information (sometimes referred to as activating the help pointer) when the help pointer is positioned over the subcommand title.

The location of the help pointer is expressed as a cartesian coordinate pair (x,y) representing its location on the computer's display. Various icons have display regions assigned to them. These regions are defined in items of the same coordinate system. Although most objects have an icon to represent them on the display, some objects may only be represented by pull-down menu sub-commands. When a menu is pulled down, the menu is considered a separate region for the purposes of the help pointer's location, even though the physical display region used may be identical to the covered icons, and have the same set of x and y values.

The present invention uses "pointer sensitive areas" to determine when the help pointer is pointing at the icon. A pointer sensitive area is a region of the display associated with an icon or other symbol. FIG. 3 illustrates the correspondence of a physical display region of an icon and its associated pointer sensitive area. In FIG. 3, pointer 400 is the icon which represents the help pointer's current location on the screen. The pencil icon 402 and the spray can icon 406 are icons which represent tasks that may be performed by a hypothetical program. In this example, pointer sensitive area 404 surrounds the pencil icon 402 and has a rectangular shape. Similarly, pointer sensitive area 408 surrounds the spray can icon 406.

In the preferred embodiment, pointer sensitive areas are rectangular in shape. However, the shape of the pointer sensitive areas can be arbitrary. To facilitate user interaction, pointer sensitive areas may be modified so as to roughly correspond to the shape of their associated icon. This modification may be particularly advantageous where irregularly shaped icons are involved or in areas of the display where several icons are located closely together. When the pointer sensitive area is rectangular, it is defined by four values. The four values are the maximum x- and y-coordinates and the minimum x- and y-coordinates of the icon. This scheme allows for fast and simple comparisons with the help pointer's x and y coordinates to determine if the help pointer lies in a pointer sensitive area. The computer system merely compares the help pointer's x coordinate with the maximum and minimum values of the x coordinate of each icon. The same is done for the y coordinates. If the help pointer's coordinates fall within a par of x and y values, then the help pointer is pointing at an icon which has a particular identification in the system of the invention. When pointer sensitive area is not rectangular, the comparison is carried out in a similar, albeit more complicated manner.

Once a pointer sensitive area has been pointed to, the next task is to determine the icon activated. This is done by associating (sometimes referred to a "linking") the pointer sensitive area with its corresponding icon. Each icon has associated with it at least one help message. There may be more than one help message for each icon. In that event, the computer system must select one of the help messages in the manner described below.

All of the help messages for the various programs are stored in a database, in the computer system's memory. Ideally, the help messages are written during a program's development. As various parts of the program evolve, further detail generates additional help messages. Thus, the help database evolves in an interactive manner. While the preferred embodiment contemplates developing the help database by this technique, any other equivalent methods can be used. If, for example, the help messages are being written for an existing program, then all of the messages will be written at the same time.

The present invention provides help messages to the user which are "context-sensitive." This means that the messages relate to the particular operation which the user is performing when he requests help. Assume, for example, that the user requests help while attempting to store a data file on a permanent storage device such as a floppy disk. The present invention evaluates the context in which the request is made and will provide the proper message to the user. In this example, the present invention may tell the user how to operate the floppy disk or how to store data files in general. The exact message which is displayed will depend on the messages available to the system and the specific evaluation scheme which is employed. Context sensitive help is an improvement over prior art methods in that the user is not required to manually search through many help messages in order to find the appropriate one. That search process takes up time which could be more advantageously spent operating the computer.

Referring again to FIG. 1, the context of the help request is evaluated in Step 104. Context is provided in various ways. The most detailed context is supplied by the program, which can include a history of recent activity, the computer's current status, the active section of the program, and other pertinent information. Other relevant contexts include the type of information sought by the user and the user's sophistication level. To provide more detail regarding the context, a pull-down menu dedicated solely to help functions may be provided. This pull-down menu may provide sub-commands entitled "What is it?", "How do I?" "What can I do?", "Can I do?" and the like. Selection of one of these sub-commands varies the help message presented. The help message is directed towards the nature of the query in addition to its subject matter. Help menu sub-commands entitled "Novice," "Moderate," and "Experienced" may also specify a sophistication level as another element of the context. These selections will change the amount of detail that a particular help message contains. A more experienced user will generally only need brief help statements, while a beginner will require more involved explanations. Even if the program supplies no context information, the routines in the present invention can still discover some context, such as the current window or the current selection, from the operating system.

The context information suggests the appropriate help message to retrieve. Using the identified object and the context information as keys, a query is made to the help database in step 106. The database returns the most appropriate help information. Deciding which message is most appropriate is accomplished by a pre-selected algorithm. Such algorithms are well known in the art and will not be described in detail here.

Having calculated the amount of display area needed for the help message, the method then locates an area of the computer's video display in which to place the bubble. The area should be large enough to hold the entire message as well as relatively close to the icon about which help information is sought.

In step 110, the bubble is drawn on the display and the appropriate help message is placed within it. In the preferred embodiment, the bubble has a rectangular shape with rounded corners. Additionally, one of the corners has a small pointed extension directed at the selected icon. The borders of the bubble are relatively thin lines with the help message presented completely within their confines. In the preferred embodiment the bubble has a height-to-width ratio of 2:3. The manner in which the size of the bubble is calculated is described above. Of course, differently shaped and dimensioned bubbles can be used without departing from the scope of the present invention. The bubble is placed on an imaginary (usually horizontal) line connecting the center of the video display to the icon. In this manner the bubble does not overlay and obscure the icon. Of course the bubble may be placed in other locations to achieve the same result. For example, the bubble may always be located immediately below the icon. The bubble is further located near the icon so as to be readily identifiable to the user. FIG. 2 is an illustration of a graphic bubble containing a help message which has been drawn on a computer display according to the method of the present invention.

In the preferred embodiment, the help message remains on the display until the user takes an action which causes its removal. As noted above, when the help mode is deactivated in step 114, all of the bubbles are erased. Alternatively, the bubble may be removed when the user requests help about a different icon.

The special case of positioning the help pointer at pull-down menu sub-commands illustrates the display/removal process when the messages are removed each time the pointer points to a different icon. By pointing to a command title in the menu bar and activating (e.g., pressing a button on the mouse) the pointer in the help mode, the menu sub-commands are displayed. When the subcommands are displayed, the help pointer down may be positioned over a subcommand. When this happens, the present invention determines the help pointer is at a pointer sensitive area. Next, the appropriate help message is retrieved based on the context of the system and is displayed in a bubble next to the first menu option. This subcommand help message remains displayed until the help pointer proceeds down to the second subcommand. At this juncture, the present invention ascertains that the help pointer now points to a different icon. This removes the first help message and initiates the display process for the second sub-command's help message. There is no need to activate the pointer (or select the subcommand or item) separately for each subcommand.

The foregoing description has assumed that the present invention is accomplished by means of a single computer program. With this single computer program, all of the steps of the present invention are performed by an application program running on the computer system. As used herein, an "application program" is a program that is separate and distinct from the computer system's operating system. An operating system is a sequence of computer instructions which perform the basic functions of the computer (such as communications with keyboards, input-output, memory management, and the like). In some instances it may be desirable to include appropriate programming in the application program to accomplish all of the steps of the present invention. In other instances, however, such an approach may not be desirable. For example, all of the instructions which are required to implement the method of the present invention may result in the application program being unacceptably large. Also, the existence of the instructions for the present invention may slow down the operation of the application program.

It is therefore intended that alternative embodiments of the present invention will include at least part of the instructions for the execution of the method to be stored in the operating system of the computer system. This approach is advantageous because the instructions do not need to be repeated within each application program. Instead, the various steps in the present method are implemented as sub-routines within the operating system. The application program provides the help message database and the appropriate coordinates for each of the pointer sensitive areas and the appropriate pointers to the database for each of the pointer sensitive areas to the operating system whenever the help mode is activated. The operating system then performs all of the necessary functions (e.g., steps 102, 103, 104, 106, 108 and 110) to implement the present invention.

FIG. 4 shows a flowchart diagram of an alternative embodiment where the application program and the operating system work together in an interactive manner to perform the steps of the present invention and the operating system performs some (but not all) of the functions which implement the present invention. That is, the application program can use sets of instructions which are stored in the operating system as sub-routines typically by making calls to those subroutines of the operating system to perform the steps of the present invention. The application program, as shown in FIG. 4, determines in step 201 whether the user has placed the system in the help mode. Then the application program, in step 202, determines whether the user has instructed the system to exit the help mode or has selected a particular item on the screen. If the user has selected a particular item on the screen (e.g., by either pointing to and selecting an icon or alternatively by merely pointing to an icon), the application program in step 203 associates the user's selection of the icon with a database look-up key (pointer) and then provides the database look-up key to the operating system of the computer. As explained above, the application will typically use the coordinates of the pointer sensitive areas to determine the appropriate database look-up key; the coordinates and the database look-up key may be provided in a look-up table where the coordinates are cross-referenced to the database look-up key. In return, the operating system will perform standardized functions such as retrieving the help information from the help database, calculating the size of the graphic bubble and locating and displaying the graphic bubble (containing the information) on selected portions of the video display. As shown in step 210, the system software (operating system) uses the database look-up key which is provided by the application program to retrieve the help information from the help database. The system software (shown diagrammatically as 204) then calculates the location, size and graphical contents of the help message in step 211 and displays the help message in a graphic bubble in step 212.

A second alternative embodiment of the Bubbled Help method allows a user to generate his own help messages. Allowing user-written help requires another activation mechanism. For example, a separate switch could activate a user message notepad or, during the help mode, an additional keystroke or help menu item could initiate it. Once the user message notepad is activated, the user inputs a help message which is associated with a particular icon or event. This message is stored in the computer's memory. Then, upon subsequent help mode activation, a bubble containing the user supplied help message appears.

Accordingly, an improved method of supplying help information to a computer user has been provided. In the foregoing Specification, the invention has been described with reference to certain exemplary embodiments. It will be appreciated by those skilled in the art that these specific examples may be varied without departing from the broader scope of the present invention. Some of these variations have been described above. Others are possible. The foregoing Specification should be regarded in an illustrative, rather than restrictive sense, the invention being limited only by the following claims.

We claim:

1. In a computer system having a video display and a graphic interface, a method of providing help information to a user of said computer system comprising the steps of:
   associating a first help message and a second help message with a first pictorial icon having a first pointer sensitive area on a video display of said computer system;
   activating a concurrent help mode of said computer system in response to a first user input to said computer system, said concurrent help mode functioning without taking precedence over another program operating in said computer system, said computer system remaining in the concurrent help mode until deactivated;
   moving a pointer on said graphic interface over said first pointer sensitive area associated with said first pictorial icon;
   selecting one of the first help message and the second help message associated with said first pictorial icon from a help message database stored in said computer's memory based upon a context of the computer system, the context being determined based upon factors including sophistication of the user and a current status of the computer system;
   calculating the size of a graphic bubble to contain the selected help message;
   locating a selected portion of said graphic interface having a size sufficient to accommodate said graphic bubble;
   displaying said selected help message to said user in said graphic bubble on said video display while said pointer is over said first pointer sensitive area, display of said selected help message not preempting operation of another program operating within said computer system, said graphic bubble being positioned within said selected portion; and
   removing said selected help message and said graphic bubble from said video display when said pointer is no longer over said first pointer sensitive area.

2. The method as described in claim 1, wherein said method is accomplished by a stored program in system software of said computer system which can be invoked by an application program.

3. The method as described in claim 1, wherein said method is accomplished in part by system software stored in said computer system's memory and in part by an application program running on said computer system.

4. The method as described in claim 1 wherein said first user input comprises depressing a preselected key on a keyboard of said computer system.

5. The method as described in claim 1 wherein said first user input comprises a first menu selection from a pull down menu of said graphic interface.

6. The method as described in claim 1 wherein said selected portion is located along an imaginary line connecting said first pictorial icon and a center pointer of said video display, substantially adjacent to said first pictorial icon.

7. The method as described in claim 1, wherein said graphic bubble is displayed on said video display so as not to overlap with said first pictorial icon.

8. The method as described in claim 1 wherein said graphic bubble is substantially rectangular in shape having rounded corners and which incorporates a pointed extension extending from one of said corners of said bubble towards said first pictorial icon.

9. The method as described in claim 8 wherein said rectangular graphic bubble has dimensions such that its height-to-width ratio is equal to two-to-three.

10. The method as described in claim 1 wherein said first pointer sensitive area has a shape substantially coincident with the first pictorial icon.

11. The method as described in claim 1 wherein said first pointer sensitive area is substantially rectangular in shape and surrounds the first pictorial icon.

12. The method as described in claim 1 wherein said pointer has the shape of a question mark after said help mode is activated.

13. The method of claim 1 wherein said first pointer sensitive area has a first set of Cartesian coordinates, said pointer has a second set of Cartesian coordinates representative of a current location of said pointer, and wherein said pointer is identified as being over said first pointer sensitive area by determining whether said second set of Cartesian coordinates is a subset of said first set of Cartesian coordinates.

14. The method of claim 1 further including a first subset of steps and a second subset of steps and wherein the first subset of the steps are implemented by an operating system and are accessible to a multiplicity of application programs, each application program implementing the second subset of steps.

15. A method for providing help information to a user of a computer system in an interactive computing environment including a graphic interface, comprising the steps of:
   associating a first help message and a second help message with a first pictorial icon having a pointer sensitive area of a video display of said computer system;
   activating a concurrent help mode in response to a first user input to said computer system, said concurrent help mode functioning without taking precedence over another program operating in said computer system, said concurrent help mode remaining active until deactivated by the user;
   monitoring the position of a pointer on a video display of said computer until said pointer is positioned over the pointer sensitive area associated with the first pictorial icon, the positioning of the pointer over the first pictorial icon representing a help request;
   determining a context of the help request, the context being determined based upon factors including sophistication of the user and a current state of the computer system;
   selecting one of the first help message and the second help message based upon the context;
   displaying said selected help message for said first pictorial icon in proximity to said first pictorial icon in a graphic bubble, said selected help message being displayed while said pointer is positioned over the pointer sensitive area without preempting operation of another program operating in the computer system;

said method being accomplished by means of a stored set of instructions in a memory device of said computer system, said instructions being a subset of an operating system program which can be called by an application program running on said computer system.

16. The method of claim 15 wherein said pointer sensitive area has a first set of Cartesian coordinates and said pointer position has a second set of Cartesian coordinates, and wherein said pointer is identified as being positioned over the pointer sensitive area by determining whether the second set of Cartesian coordinates is a subset of the first set of Cartesian coordinates.

17. The method of claim 16 further including a first subset of steps and a second subset of steps and wherein the first subset of the steps are implemented by an operating system and are accessible to a multiplicity of application programs, each application program implementing the second subset of steps.

18. A computer system including a graphic interface for providing help information to a user of said computer system, said computer system comprising:

a pointer control device for controlling the position of a pointer on a video display of said computer system;

means for activating a concurrent help mode of said computer system in response to a first user input to said computer system, said concurrent help mode functioning without taking precedence over another program operating in said computer system, said concurrent help mode remaining active until deactivated by the user;

means for monitoring the position of said pointer and determining whether the pointer is over a first pictorial icon on said video display, and said means for monitoring being coupled to said pointer control device to monitor the position of said pointer;

means for determining a context of the computer system when the pointer is over the first pictorial icon, the context being determined based upon factors including sophistication of a user of the computer system and a current state of the computer system;

means for selecting and retrieving one of a first help message and a second help message based upon the context, both of said first help message and second help message being associated with the first pictorial icon, said means for selecting and retrieving being coupled to said means for monitoring to determine when the pointer is over said first pictorial icon; and means for displaying said selected help message in a graphic bubble on said video display, said means for displaying being coupled to said means for selecting and retrieving to provide said selected help message to said means for displaying, said selected help message being displayed while the pointer is over the first pictorial icon without preempting the operation of another program operating in the computer system.

* * * * *